(12) United States Patent
Miller et al.

(10) Patent No.: US 10,358,169 B2
(45) Date of Patent: Jul. 23, 2019

(54) COVERLESS BATTERY ASSEMBLY FOR ELECTRIFIED VEHICLE

(71) Applicant: FORD GLOBAL TECHNOLOGIES, LLC, Dearborn, MI (US)

(72) Inventors: Daniel Miller, Dearborn, MI (US); Dave Moschet, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 504 days.

(21) Appl. No.: 14/640,370

(22) Filed: Mar. 6, 2015

(65) Prior Publication Data
US 2016/0257219 A1    Sep. 8, 2016

(51) Int. Cl.
| | |
|---|---|
| *B60R 16/04* | (2006.01) |
| *B62D 25/24* | (2006.01) |
| *B60K 1/04* | (2019.01) |
| *B62D 25/20* | (2006.01) |
| *H01M 2/10* | (2006.01) |
| *B60L 50/60* | (2019.01) |

(52) U.S. Cl.
CPC ............... *B62D 25/24* (2013.01); *B60K 1/04* (2013.01); *B60L 50/66* (2019.02); *B62D 25/20* (2013.01); *H01M 2/1072* (2013.01); *B60K 2001/0438* (2013.01); *H01M 2220/20* (2013.01)

(58) Field of Classification Search
CPC ..... B60L 11/1877; B62D 25/24; B62D 25/20; B60K 1/04; B60K 2001/0438; B60K 2001/0405; B60R 16/04
See application file for complete search history.

(56) References Cited

U.S. PATENT DOCUMENTS

| | | | | |
|---|---|---|---|---|
| 4,058,182 | A | 11/1977 | Huber | |
| 5,501,289 | A * | 3/1996 | Nishikawa | B60K 1/04 180/65.1 |
| 5,555,950 | A * | 9/1996 | Harada | H01M 2/1083 180/232 |
| 6,085,854 | A * | 7/2000 | Nishikawa | B60K 1/04 180/68.5 |
| 6,188,574 | B1 * | 2/2001 | Anazawa | B60K 1/04 180/68.5 |
| 6,828,755 | B1 * | 12/2004 | Iverson | H01M 16/00 320/104 |
| 7,614,469 | B2 | 11/2009 | Kumar et al. | |
| 7,688,582 | B2 * | 3/2010 | Fukazu | B60K 1/04 180/65.1 |
| 7,743,863 | B2 * | 6/2010 | Shindou | B60K 1/04 180/68.5 |
| 8,186,735 | B2 * | 5/2012 | Maceri | B62D 25/20 280/783 |
| 8,469,129 | B2 * | 6/2013 | Mildner | B60K 1/04 180/68.5 |
| 8,517,131 | B2 * | 8/2013 | Kovach | H01M 2/1083 180/68.5 |
| 8,739,907 | B2 * | 6/2014 | Storc | B60K 1/04 180/65.29 |

(Continued)

*Primary Examiner* — James M Dolak
(74) *Attorney, Agent, or Firm* — Carlson, Gaskey & Olds

(57) ABSTRACT

An electrified vehicle according to an exemplary aspect of the present disclosure includes, among other things, a floor pan and a battery assembly mounted to an underside of the floor pan. The battery assembly includes an open top such that the floor pan acts as a cover of the battery assembly.

19 Claims, 5 Drawing Sheets

(56) References Cited

U.S. PATENT DOCUMENTS

| | | | |
|---|---|---|---|
| 8,789,634 B2* | 7/2014 | Nitawaki | B60K 1/04 180/68.5 |
| 8,814,255 B2* | 8/2014 | Yamaji | B62D 25/20 296/193.07 |
| 8,852,794 B2* | 10/2014 | Laitinen | H01M 2/1083 429/148 |
| 8,939,246 B2* | 1/2015 | Yamaguchi | B60K 1/04 180/311 |
| 9,120,371 B2* | 9/2015 | Han | H01M 2/1083 |
| 9,172,071 B2* | 10/2015 | Yoshioka | B60K 1/04 |
| 9,227,582 B2* | 1/2016 | Katayama | B60K 1/04 |
| 9,242,539 B2* | 1/2016 | Ling | B60K 1/04 |
| 9,254,609 B2* | 2/2016 | Choi | B29C 70/20 |
| 9,259,998 B1* | 2/2016 | Leanza | B60K 1/04 |
| 9,281,505 B2* | 3/2016 | Hihara | H01M 2/1083 |
| 9,419,263 B2* | 8/2016 | Nakamori | H01M 2/1077 |
| 9,490,460 B2* | 11/2016 | Yanagi | H01M 2/1083 |
| 9,708,011 B2* | 7/2017 | Stablo | B62D 27/026 |
| 9,758,029 B2* | 9/2017 | Hokazono | B60K 1/04 |
| 9,761,846 B2* | 9/2017 | Nishimura | H01M 2/024 |
| 9,796,293 B2* | 10/2017 | Ito | B60L 11/1877 |
| 9,827,840 B2* | 11/2017 | Wen | B60K 1/04 |
| 9,849,768 B2* | 12/2017 | Hayashi | B60R 16/04 |
| 9,985,258 B2* | 5/2018 | Hara | H01M 2/1077 |
| 9,997,753 B2* | 6/2018 | Nomura | B60K 1/04 |
| 10,065,490 B2* | 9/2018 | Haijima | B60K 1/04 |
| 10,069,179 B2* | 9/2018 | Murata | B60L 1/003 |
| 10,220,694 B2* | 3/2019 | Mizoguchi | B60K 1/04 |
| 2008/0136110 A1 | 6/2008 | He | |
| 2011/0095571 A1 | 4/2011 | Maguire et al. | |
| 2012/0103714 A1 | 5/2012 | Choi et al. | |
| 2014/0147717 A1 | 5/2014 | Sundararajan et al. | |

* cited by examiner

COVERLESS BATTERY ASSEMBLY FOR ELECTRIFIED VEHICLE

TECHNICAL FIELD

This disclosure relates to a battery assembly for an electrified vehicle. The battery assembly is coverless and therefore includes an open top. The battery assembly may be mounted to an underside of a vehicle floor pan such that the floor pan covers the open top to provide an assembly having a reduced overall height.

BACKGROUND

The need to reduce automotive fuel consumption and emissions is well known. Therefore, vehicles are being developed that either reduce or completely eliminate reliance on internal combustion engines. Electrified vehicles are one type of vehicle being developed for this purpose. In general, electrified vehicles differ from conventional motor vehicles in that they are selectively driven by one or more battery powered electric machines. Conventional motor vehicles, by contrast, rely exclusively on the internal combustion engine to drive the vehicle.

A high voltage battery pack is employed to power the electric machines of an electrified vehicle. The high voltage battery pack typically includes multiple battery arrays that included a plurality of interconnected battery cells and various electronic components that are required to interface with the electrified vehicle. Traditionally, the high voltage battery pack is mounted in a passenger compartment, cargo space or underbody area of the electrified vehicle and therefore may occupy an amount of space that would otherwise be available for carrying passengers or cargo.

SUMMARY

An electrified vehicle according to an exemplary aspect of the present disclosure includes, among other things, a floor pan and a battery assembly mounted to an underside of the floor pan. The battery assembly includes an open top such that the floor pan acts as a cover of the battery assembly.

In a further non-limiting embodiment of the foregoing electrified vehicle, the battery assembly is mounted at a location that is remote from a passenger cabin that is located on an opposite side of the floor pan from the battery assembly.

In a further non-limiting embodiment of either of the foregoing electrified vehicles, the battery assembly is a high voltage battery assembly.

In a further non-limiting embodiment of any of the foregoing electrified vehicles, the battery assembly is mounted to a mounting area of the floor pan, the mounting area having a shape that matches a shape of a top flange of a tray of the battery assembly.

In a further non-limiting embodiment of any of the foregoing electrified vehicles, a seal is disposed between the battery assembly and the floor pan.

In a further non-limiting embodiment of any of the foregoing electrified vehicles, the floor pan includes at least one locating stud for locating the battery assembly relative to the floor pan.

In a further non-limiting embodiment of any of the foregoing electrified vehicles, an access door is movable to expose internal components of the battery assembly.

In a further non-limiting embodiment of any of the foregoing electrified vehicles, the battery assembly includes at least one battery array positioned within a tray.

In a further non-limiting embodiment of any of the foregoing electrified vehicles, the battery assembly includes a tray having a top flange with a plurality of mounting openings.

In a further non-limiting embodiment of any of the foregoing electrified vehicles, a battery array is recessed from the top flange within the tray.

A method according to another exemplary aspect of the present disclosure includes, among other things, mounting a high voltage battery assembly that includes an open top to an underside of a floor pan of an electrified vehicle such that the floor pan covers internal components of the battery assembly.

In a further non-limiting embodiment of the foregoing method, the internal components include at least one of a battery array and battery electronics.

In a further non-limiting embodiment of either of the foregoing methods, the method includes accessing the internal components through an access door of the floor pan.

In a further non-limiting embodiment of any of the foregoing methods, the method includes, prior to the mounting step, removing a temporary cover of the high voltage battery assembly.

In a further non-limiting embodiment of any of the foregoing methods, the mounting step includes aligning the high voltage battery assembly to the floor pan using at least one locating stud of the floor pan.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes an exemplary battery assembly for an electrified vehicle. The battery assembly is mounted to an underside of a floor pan of the electrified vehicle. The battery assembly includes an open top such that the floor pan covers the internal components of the battery assembly once the battery assembly is mounted to the floor pan. Utilizing the floor pan to cover the open top of the battery assembly reduces the overall height of the battery assembly, thereby increasing the amount of available packaging space. These and other features are discussed in greater detail in the following paragraphs of this disclosure.

Figure 1:
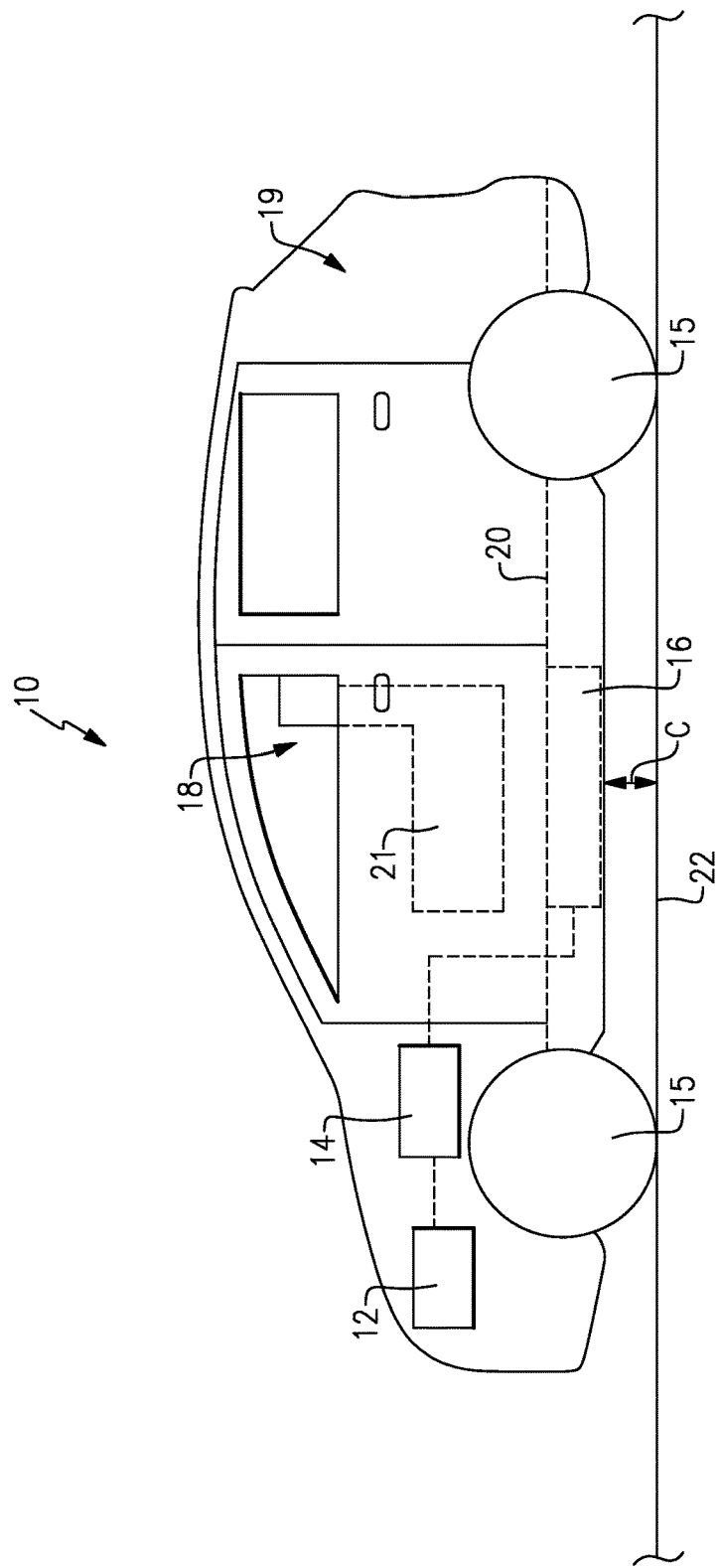
FIG. 1 schematically illustrates an electrified vehicle.

FIG. 1 schematically illustrates an electrified vehicle 10. In one non-limiting embodiment, the electrified vehicle 10 is a hybrid electric vehicle (HEV). However, this disclosure is not limited to HEV's and could extend to other types of electrified vehicles, including but not limited to plug-in hybrid electric vehicles (PHEV's) and battery electric vehicles (BEV's). The electrified vehicle 10 is also depicted in one non-limiting embodiment as a car. However, trucks, cars, vans or any other types of vehicles could benefit from the teachings of this disclosure. In addition, although an example component relationship is illustrated in FIG. 1, this illustration is not intended to limit this disclosure. In other words, the placement and orientation of the various components of the electrified vehicle could vary from one vehicle to another.

The exemplary electrified vehicle 10 includes a powertrain that may include an engine 12 and an electric machine 14. The engine 12, which may be an internal combustion engine, and the electric machine 14, which could be a motor, generator or a combined motor/generator, may be employed as available drive sources for the electrified vehicle 10. For example, the engine 12 and/or the electric machine 14 can generate torque to drive one or more sets of vehicle drive wheels 15 of the electrified vehicle 10. A high voltage battery assembly 16 may electrically power the electric machine 14.

The electrified vehicle 10 additionally includes a passenger cabin 18 and a cargo area 19 to the rear of the passenger cabin 18. A floor pan 20 separates the passenger cabin 18 from a driving surface 22. The battery assembly 16 may be mounted to the floor pan 20 such that it is remote from both the passenger cabin 18 and the cargo area 19. The battery assembly 16 therefore does not occupy space that would otherwise be available for carrying passenger for cargo. In one embodiment, the battery assembly 16 is mounted to the floor pan 20 at a location that is beneath a driver side seat 21 of the electrified vehicle 10. However, other mounting locations are also contemplated.

A clearance C may extend between the battery assembly 16 and the driving surface 22. The clearance C must include a sufficient amount of space to prevent the battery assembly 16 from bottoming out as the electrified vehicle 10 travels along the driving surface 22. The driving surface 22 may be any of a variety of driving surfaces. Prior art battery assemblies, which typically include a battery pack housed inside a tray and a cover, present packaging challenges because of their relatively large overall heights.

Figure 2:
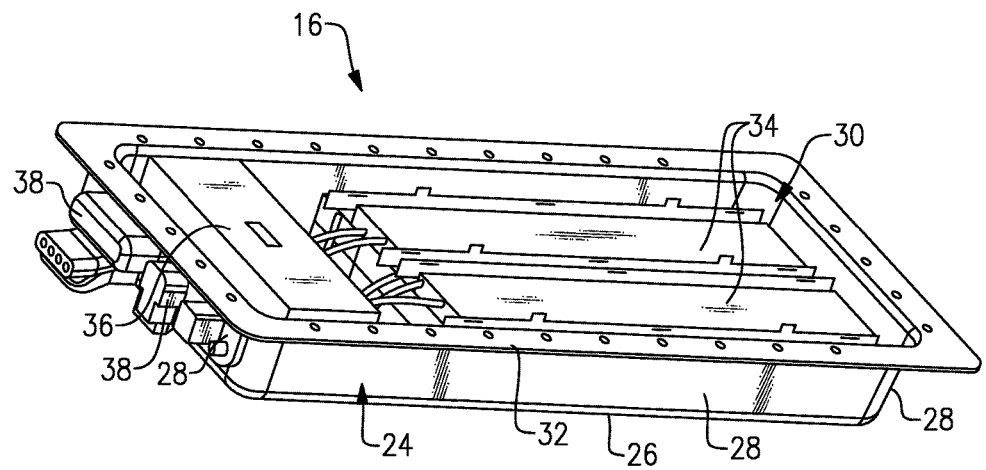
FIG. 2 illustrates a battery assembly that can be employed within an electrified vehicle.
Figure 3:
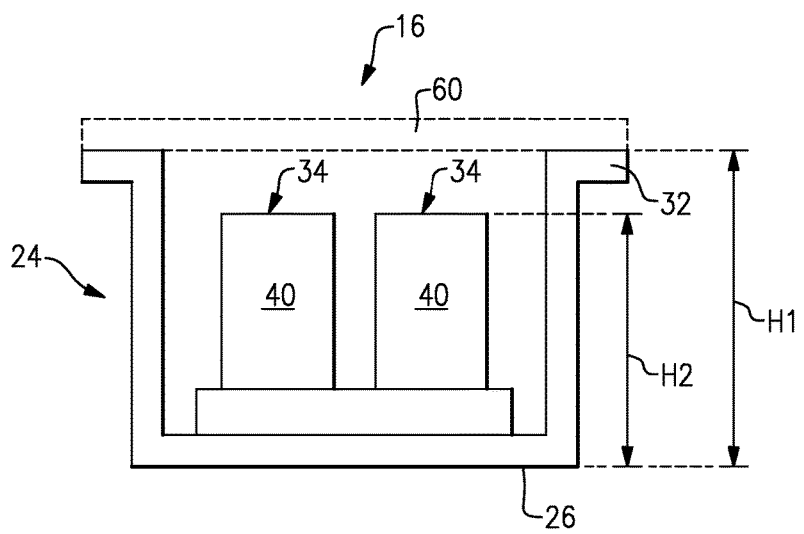
FIG. 3 is a cross-sectional view through a battery pack.

FIGS. 2 and 3 illustrate an exemplary battery assembly 16. The battery assembly 16 may include a tray 24 having a bottom wall 26 and sidewalls 28 that protrude upwardly from the bottom wall 26. A top flange 32 extends from each sidewall 28 around the tray 24. The top flange 32 provides a mounting surface for mounting the battery assembly 16.

One or more battery arrays 34 may be received within the tray 24. In one embodiment, the battery arrays 34 are positioned against the bottom wall 26 and are disposed between the sidewalls 28. The battery arrays 34 include a plurality of battery cells stacked side-by-side to build the battery array 34 (see, for example, FIG. 3). The battery assembly 16 may additionally include various battery electronics 36 mounted within the tray 24. Connectors 38 may extend from one or more of the sidewalls 28 of the tray 24. The connectors 38 are adapted to connect cooling or electrical lines (not shown) of the battery assembly 16 to the components of the electrified vehicle, such as an electric motor, etc.

The tray 24 of the battery assembly 16 includes an open top 30. In other words, the battery assembly 16 is coverless prior to final assembly to the vehicle. In one embodiment, the top flange 32 circumscribes the open top 30. The internal components (i.e., the battery arrays 34, battery electronics 36, etc.) of the battery assembly 16 may be exposed prior to securing the battery assembly 16 to a floor pan of an electrified vehicle, as further discussed below.

FIG. 3 is a cross-sectional view of the battery assembly 16. In this embodiment, the battery assembly 16 includes two battery arrays 34. However, the battery assembly 16 could employ a greater or fewer number of battery arrays 34. Each battery array 34 includes a plurality of battery cells 40 stacked side-by-side (into the page in FIG. 3) to build a cell stack of the battery array 34.

The battery assembly 16 includes an overall height H1 that extends from the top flange 32 to the bottom wall 26 of the tray 24. The overall height H1 of the battery assembly 16 is substantially reduced compared to prior art battery assemblies because the battery assembly 16 excludes any cover that is secured to the tray 24.

The battery arrays 34 are positioned inside the tray 24. In one embodiment, the battery arrays 34 are recessed from to the top flange 32 of the tray 24. For example, each battery array 34 may include a height H2 that is less than the overall height H1 of the battery assembly 16. This recessed configuration provides adequate packaging clearances between the battery arrays 34 and other components both internal and external to the battery assembly 16.

In a non-limiting embodiment, the battery assembly 16 optionally includes a temporary cover 60 (shown in phantom). The temporary cover 60 may be removably secured to the top flange 32 of the tray 24 to house the internal components of the battery assembly 16. If provided, the temporary cover 60 is removed prior to mounting the battery assembly 16 to a vehicle.

Figure 4:
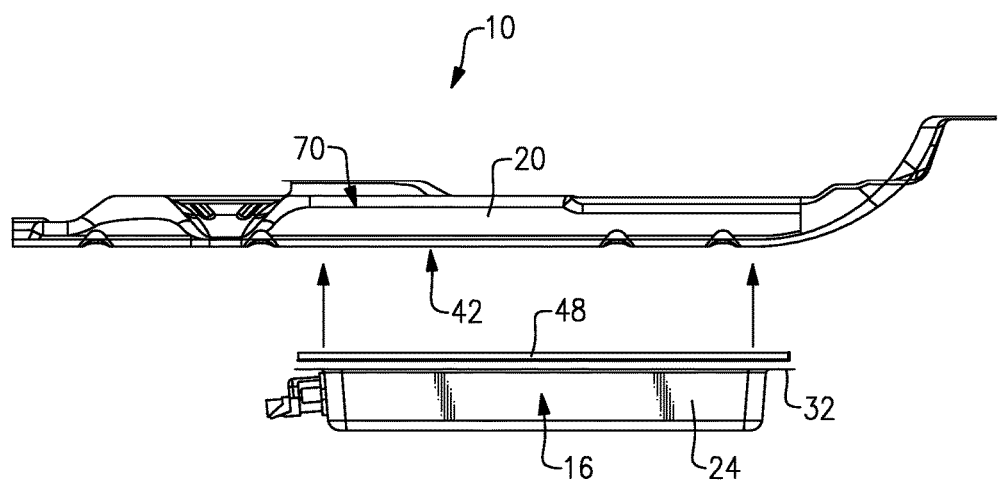
FIGS. 4, 5 and 6 schematically illustrate the installation of a battery assembly to a floor pan of an electrified vehicle.
Figure 5:
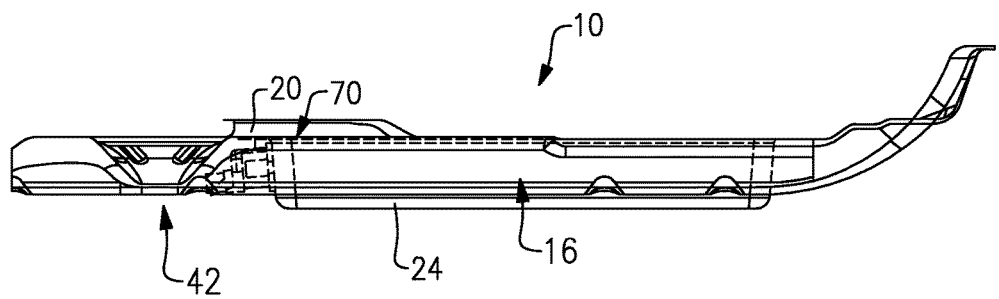
Figure 6:
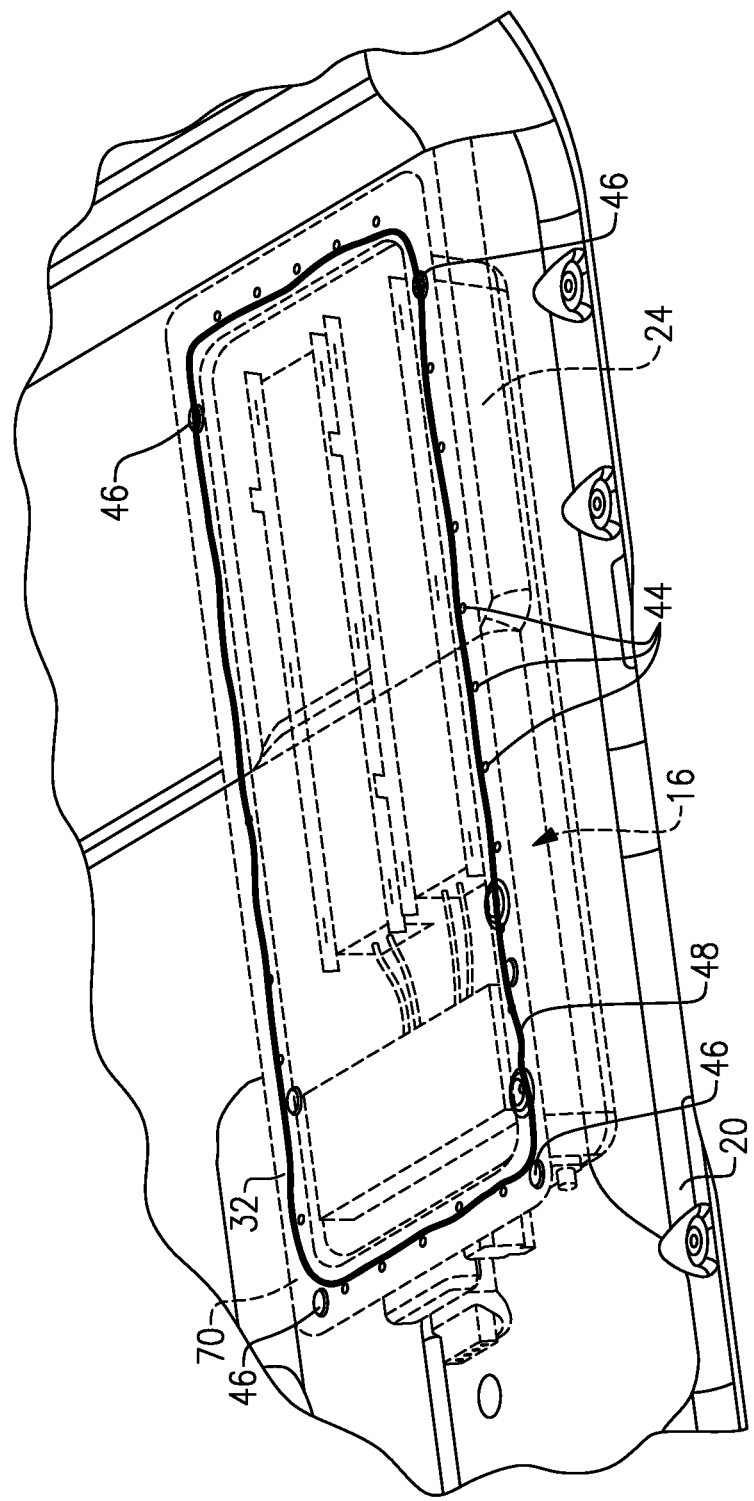

FIGS. 4, 5 and 6 schematically illustrate the installation of a battery assembly 16 to a floor pan 20 of the electrified vehicle 10. In one embodiment, the battery assembly 16 is mounted to an underside 42 of the floor pan 20. The battery assembly 16 may be secured to the floor pan 20 using any fastening method, including but not limited to bolting, strapping, welding, etc.

In one embodiment, the battery assembly 16 is mounted to a mounting area 70 of the floor pan 20. The mounting area 70 includes a shape that matches that of the top flange 32 of the tray 24 of the battery assembly 16. The mounting area 70 therefore provides a substantially flat, uniform surface for securing and sealing the battery assembly 16 to the floor pan 20.

The top flange 32 of the tray 24 of the battery assembly 16 may include a plurality of openings 44 (best shown in FIG. 6). The openings 44 are configured to receive the fasteners 46 for mounting the battery assembly 16 to the floor pan 20. The number of openings 44 and fasteners 46 that are utilized to mount the battery assembly 16 to the floor pan 20 are not intended to limit this disclosure.

In another embodiment, a seal 48 (see FIG. 4) is disposed between the top flange 32 of the tray 24 and the floor pan 20. The seal 48 prevents the ingress of moisture into the battery assembly 16. Any type of seal may be used to seal the connection between the battery assembly 16 and the floor pan 20.

Figure 7:
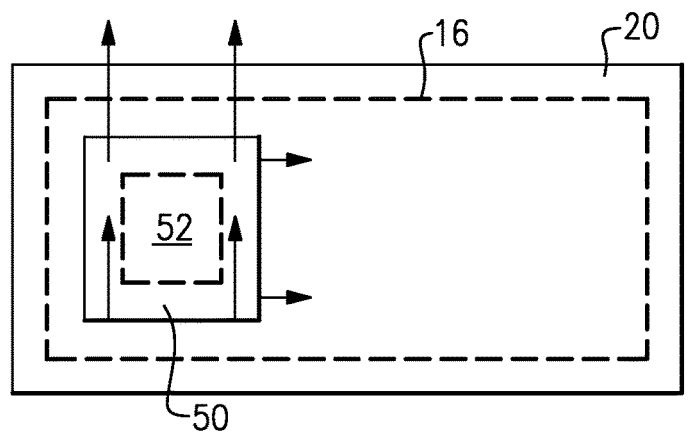
FIG. 7 illustrates an access door for service accessing internal components of a battery assembly that has been mounted to a floor pan.

The battery assembly 16 may require servicing subsequent to being mounted to the floor pan 20. Accordingly, as shown in FIG. 7, the floor pan 20 may include one or more access doors 50 for providing access to internal components 52 of the battery assembly 16. In one embodiment, each access door 50 is moveable relative to the floor pan 20 to expose the internal components 52. For example, the access door 50 could be hinged to the floor pan 20 or could be slidable into a pocket of the floor pan 20. In another embodiment, the access door 50 is completely removable from the floor pan 20 to expose the internal components 52. The internal components 52 could include, among other parts, the battery arrays 34, the battery electronics 36, wiring, connectors and/or any other internal components. In an alternative embodiment, the entire battery assembly 16 could be serviced by undecking, or dismounting, the battery assembly 16 from the floor pan 20.

Figure 8:
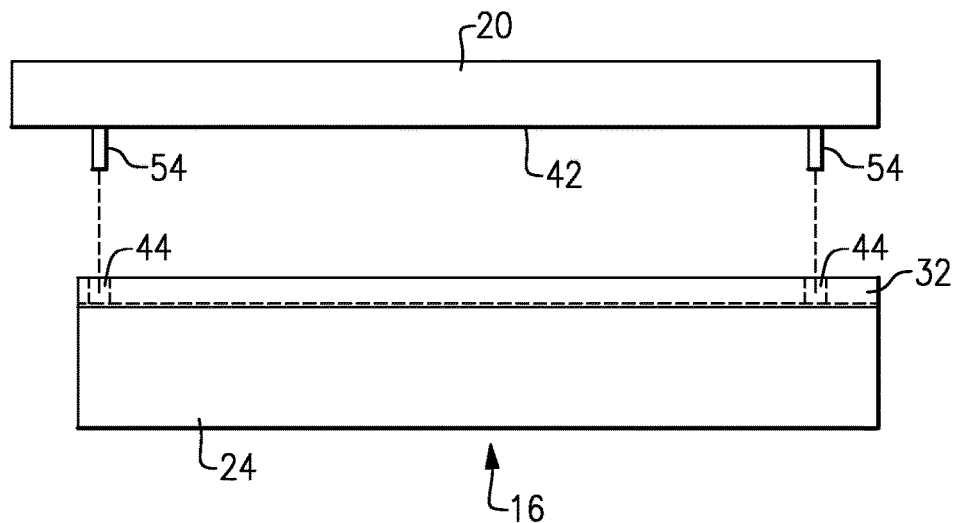
FIG. 8 illustrates locating features for locating a battery assembly relative to a floor pan.

FIG. 8 illustrates additional features that may be provided to simplify installation of the battery assembly 16 to the floor pan 20. In one embodiment, the floor pan 20 may include locating studs 54 that protrude from the underside 42 of the floor pan 20. The locating studs 54 may be utilized to properly locate the battery assembly 16 to the floor pan 20. For example, the locating studs 54 may be received through openings 44 in the top flange 32 of the tray 24 to properly locate the battery assembly 16 relative to the floor pan 20 during installation.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising:
a floor pan;
a battery assembly mounted directly to an underside of said floor pan, said battery assembly including an open top such that said floor pan acts as a cover of said battery assembly; and
wherein said battery assembly is a high voltage battery assembly;
wherein said floor pan includes at least one locating stud for locating said battery assembly relative to said floor pan, and said locating stud protrudes from said underside and extends through a first opening of a tray of said battery assembly and a fastener extends through a second opening of said tray.

2. The electrified vehicle as recited in claim 1, wherein said battery assembly is mounted at a location that is remote from a passenger cabin that is located on an opposite side of said floor pan from said battery assembly.

3. The electrified vehicle as recited in claim 1, wherein said battery assembly is mounted to a mounting area of said floor pan, said mounting area having a shape that matches a shape of a top flange of a tray of said battery assembly.

4. The electrified vehicle as recited in claim 1, comprising a seal disposed between said battery assembly and said floor pan.

5. The electrified vehicle as recited in claim 1, comprising an access door movable to expose internal components of said battery assembly.

6. The electrified vehicle as recited in claim 1, wherein said battery assembly includes at least one battery array positioned within a tray.

7. The electrified vehicle as recited in claim 1, wherein said battery assembly includes a tray having a top flange with a plurality of mounting openings.

8. The electrified vehicle as recited in claim 7, comprising a battery array recessed from said top flange within said tray.

9. A method, comprising:
mounting a high voltage battery assembly that includes an open top directly to an underside of a floor pan of an electrified vehicle such that the floor pan covers internal components of the battery assembly;
wherein the mounting step further includes: aligning the high voltage battery assembly to the floor pan using at least one locating stud of the floor pan, wherein said floor pan includes the least one locating stud for locating said battery assembly relative to said floor pan, and the at least one locating stud protrudes from said underside and extends through a first opening of a tray of said battery assembly and a fastener extends through a second opening of said tray.

10. The method as recited in claim 9, wherein the internal components include at least one of a battery array and battery electronics.

11. The method as recited in claim 9, comprising accessing the internal components through an access door of the floor pan.

12. The method as recited in claim 9, comprising, prior to the mounting step, removing a temporary cover of the high voltage battery assembly.

13. An electrified vehicle, comprising:
a floor pan;
a battery assembly mounted directly to an underside of said floor pan, said battery assembly is a high voltage battery assembly, and includes an open top such that said floor pan is adapted to cover said battery assembly;
a seal sandwiched between a top flange of said battery assembly and said underside of said floor pan; and
wherein said floor pan includes at least one locating stud for locating said battery assembly relative to said floor pan, wherein said at least one locating stud is received through an opening of the top flange, and a fastener is received through a second opening of said top flange for mounting said battery assembly to said floor pan.

14. The electrified vehicle as recited in claim 13, comprising a battery array received within a tray of said battery assembly at a position that is recessed from said top flange.

15. The electrified vehicle as recited in claim 14, wherein said battery array includes a height that is less than an overall height of said tray.

16. The electrified vehicle as recited in claim 1, wherein said battery assembly includes a single-piece tray having a top flange, and said top flange is received directly against said underside.

17. The electrified vehicle as recited in claim 16, comprising a seal sandwiched directly between said top flange and said underside.

18. The electrified vehicle as recited in claim 1, wherein said battery assembly is non-movably mounted to said underside.

19. The method as recited in claim 9, wherein, once the battery assembly is mounted, the internal components are completely concealed inside the battery assembly.

* * * * *

UNITED STATES PATENT AND TRADEMARK OFFICE
CERTIFICATE OF CORRECTION

PATENT NO. : 10,358,169 B2
APPLICATION NO. : 14/640370
DATED : July 23, 2019
INVENTOR(S) : Daniel Miller and Dave Moschet It is certified that error appears in the above-identified patent and that said Letters Patent is hereby corrected as shown below:

In the Claims

In Claim 3, Column 6, Line 2; replace "a tray of said battery assembly." with --said tray of said battery assembly.--

In Claim 6, Column 6, Line 11; replace "within a tray" with --within said tray--

In Claim 7, Column 6, Line 13; replace "said battery assembly includes a tray having a top flange" with --said tray having a top flange--

In Claim 16, Column 6, Line 62; replace "said battery assembly includes a single-piece tray" with --said tray is a single-piece tray--

Signed and Sealed this
First Day of October, 2019

Andrei Iancu
*Director of the United States Patent and Trademark Office*